US009336030B1

(12) United States Patent
Marr et al.

(10) Patent No.: US 9,336,030 B1
(45) Date of Patent: May 10, 2016

(54) PLACEMENT AND TUNING OF VIRTUAL MACHINES

(71) Applicant: Amazon Technologies, Inc., Reno, NV (US)

(72) Inventors: Michael David Marr, Monroe, WA (US); Matthew D. Klein, Seattle, WA (US); Samuel J. McKelvie, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 520 days.

(21) Appl. No.: 13/622,088

(22) Filed: Sep. 18, 2012

(51) Int. Cl.
*G06F 9/455* (2006.01)
*G06F 9/46* (2006.01)
*G06F 9/50* (2006.01)

(52) U.S. Cl.
CPC .......... *G06F 9/45533* (2013.01); *G06F 9/5038* (2013.01); *G06F 2009/4557* (2013.01)

(58) Field of Classification Search
CPC .............................................. G06F 2009/4557
USPC ...................................................... 718/1, 106
See application file for complete search history.

(56) References Cited

U.S. PATENT DOCUMENTS

| 6,934,914 | B1* | 8/2005 | Vittal et al. .................... 715/763 |
| 8,239,572 | B1* | 8/2012 | Brandwine et al. ............ 709/240 |
| 8,856,483 | B1* | 10/2014 | Paterson-Jones et al. ..... 711/171 |
| 2007/0294671 | A1* | 12/2007 | Demetriou et al. ........... 717/124 |
| 2012/0089980 | A1* | 4/2012 | Sharp et al. ....................... 718/1 |

* cited by examiner

Primary Examiner — Camquy Truong
(74) Attorney, Agent, or Firm — Hogan Lovells US LLP (57) ABSTRACT

Approaches are disclosed for enabling owners of virtual computing resources to specify one or more constraints for their virtual machines and/or virtual networks, with respect to metrics such as cost, latency, throughput, network bandwidth, power usage, server availability, data redundancy, correlated failure susceptibility, and other such metrics. A customer can declare a set of constraints with metrics goals for their virtual machine instance or network of instances, and the service provider can optimize the placement (e.g., host selection) and various settings (e.g., hardware and software settings) to satisfy the specified constraints. The satisfaction of customer-specified constraints may need to take into account what other virtual machine instances are performing in the shared resource environment.

28 Claims, 9 Drawing Sheets

PLACEMENT AND TUNING OF VIRTUAL MACHINES

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software needed.

In this context, many cloud computing providers utilize virtualization to allow multiple users to share the underlying hardware and/or software resources. Virtualization can allow computing servers, storage device or other resources to be partitioned into multiple isolated instances that are associated with (e.g. owned by) a particular user. This can enable various users to run their applications remotely, using on the resources of the cloud computing provider. However, providing a conventional virtual computing environment has a number of limitations. For example, users are typically not provided the same level of control over the virtual resources allocated to them as they would have if they physically owned those resources. As a result, customers of a cloud computing provider are unable to customize their applications and services to the degree that may be desired.

BRIEF DESCRIPTION OF THE DRAWINGS

Various embodiments in accordance with the present disclosure will be described with reference to the drawings, in which.

DETAILED DESCRIPTION

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for customizing and/or optimizing virtualized computing environments. In particular, various embodiments provide approaches for enabling owners of virtual computing resources (e.g., a customer of a service provider) to specify one or more constraints for their virtual machines (VMs) and/or virtual networks, with respect to metrics such as cost, latency, throughput, network bandwidth, power usage, server availability, data redundancy, correlated failure susceptibility, and other such metrics. In various embodiments, a customer can declare a set of constraints with metrics goals for their virtual machine instance or network of instances, and the service provider can optimize the placement (e.g., host selection) and various settings (e.g., hardware and software settings) to satisfy the specified constraints. The satisfaction of customer-specified constraints may need to take into account what other virtual machine instances are performing in the shared resource environment (e.g., other customers' virtual machines occupying the same host, workloads running on the host, etc.). As such, the placement of VMs onto hosts can be based on the workload being executed by those particular hosts.

In a conventional shared resource computing environment (e.g., "cloud" environment), a user can submit a request to a service provider (e.g., "cloud computing" provider), requesting the service provider to allocate one or more virtual resources for the user that can execute an application on behalf of the user. In response to the request, the service provider (e.g., hosting system) can provision for the user one or more virtual machine instances on at least one host computing device. These virtual machine instances can take the form of a guest operating system (e.g., user's selected operating system) running on physical host servers of the service provider. The virtual machine instance can execute one or more applications on behalf of the user or provide any number or services.

In various embodiments described herein, a user of the virtual resource can specify (e.g., via an graphical interface or API) to the hosting system a number of metrics that may be useful to the user, such as cost, throughput, latency, data redundancy, server availability, power usage or the like. For example, the user may be displayed an interface with multiple graphical elements (e.g., scroll bars, knobs, etc.) with each element corresponding to a particular metric. As such, the interface may include elements for manipulating the availability, latency, bandwidth and cost of their virtual machine. Once the user specifies their desired constraints for the metrics, the hosting system (e.g. service provider) can ensure that the underlying resources and settings are configured to satisfy the user's desired constraints.

In accordance with an embodiment, to satisfy the user-specified constraints, the service provider may control the placement of the virtual machine instance onto one or more host servers based on the attributes and configuration of those host servers. For example, some server hardware types may be better suited for performing low latency operations, while other server types may favor high throughput. Some devices may include redundant power supply, while others may not. Some server devices utilize a shared random access memory (RAM) bank (e.g., per-rack shared RAM bank). Some server devices may be connected to a 10 gigabit Ethernet, while others may be connected to 1 gigabit Ethernet. In various embodiments, the service provider may analyze the customer-specified constraints and choose to host the customer's virtual machine according to any one of these or other hosting attributes. It should be noted that these are just a few examples of the many host attributes and characteristics that can be considered when provisioning the virtual machine instance within the scope of various embodiments.

In some embodiments, the service provider may adjust one or more settings to optimize the virtual machine instance provisioned for the user. The settings may include hardware, software, firmware settings or any combination thereof. For example, in order to control power usage, the service provider may modify the power settings of memory, adjust the clock cycles, CPU cycle frequency and the like. Similarly, in order to control availability, the service provider may adjust a level of redundant array of independent disks (RAID) for distributing data across disk drives, set up a number of master-slave(s) configurations for the virtual machine, synchronize RAM and CPU state and the like. In order to control latency or throughput, the service provider may enable/disable interrupt coalescing, batching operations, segmentation offloading, and the like.

In some embodiments, the settings may be configured before provisioning the virtual machine instance on the host server. In other embodiments, the settings may be configured after the virtual machine instance has begun executing the workload for the customer. For example, if the customer decides to change the constraints of their virtual machine instance, the customer may use the interface to specify a set of new constraints. The service provider can then modify the settings to account for the new constraints. In some cases, modifying the settings may require a restart of the virtual machine instance, while in other cases, it may not.

In some embodiments, the satisfaction of customer-specified constraints may need to take into account what other customers' are doing in the shared resource environment. For example, when deciding where to provision the customer's virtual resource, the service provider may inspect the available host servers and any virtual machines provisioned for other customers occupying those host servers in order to analyze the type of workload being executed thereon. The placement of the customer's virtual machine onto the host can be based at least in part on the workload already being executed by the host.

In some embodiments, the service provider can migrate the virtual machine instances of certain customers to different host servers in order to make room for virtual machines of another customer at a later time. For example, some customers that pay a premium may be offered their own individual host servers, while virtual machines of customers offered a discounted price may be co-hosted on shared server devices. Furthermore, the virtual machine instance of a customer may be migrated to reduce fragmentation or to otherwise yield an optimized use of the hardware resources of the service provider. For example, due to the size and/or computing requirements, some virtual machine instances may be particularly well suited to being hosted on the same computing device and the service provider may choose to provision those VM instances on the same host server.

In some embodiments, the service provider may make placement decisions based on customer history or VM history information. For example, if the customer has recently experienced service level agreement (SLA) breaches, the service provider may provision the customer's VM instances on hardware that is deemed to be the most reliable in order to ensure that the SLA requirements are satisfied. The reliability of the hardware may be higher due redundant resources, software/hardware failover and other techniques. In various embodiments, the customer history information may be recorded as part of the customer profile, or maintained by a separate service. In some cases, the customer history information may indicate traffic patterns (e.g., request spikes during certain times of the day), peak computing performance utilization, maximum storage space requirements and the like.

In at least some embodiments, the system can tune the performance settings for connections between two or more virtual machines provisioned on multiple host computing devices. In particular, the system can provision a virtual network (e.g., virtual private network (VPN)) where the user is enabled to specify various desired metrics of the network. For example, a user may wish to create a subnet with low latency connections between the virtual machine nodes of the subnet, while making a sacrifice in the availability of any individual VM node in order to reduce costs.

Figure 1:
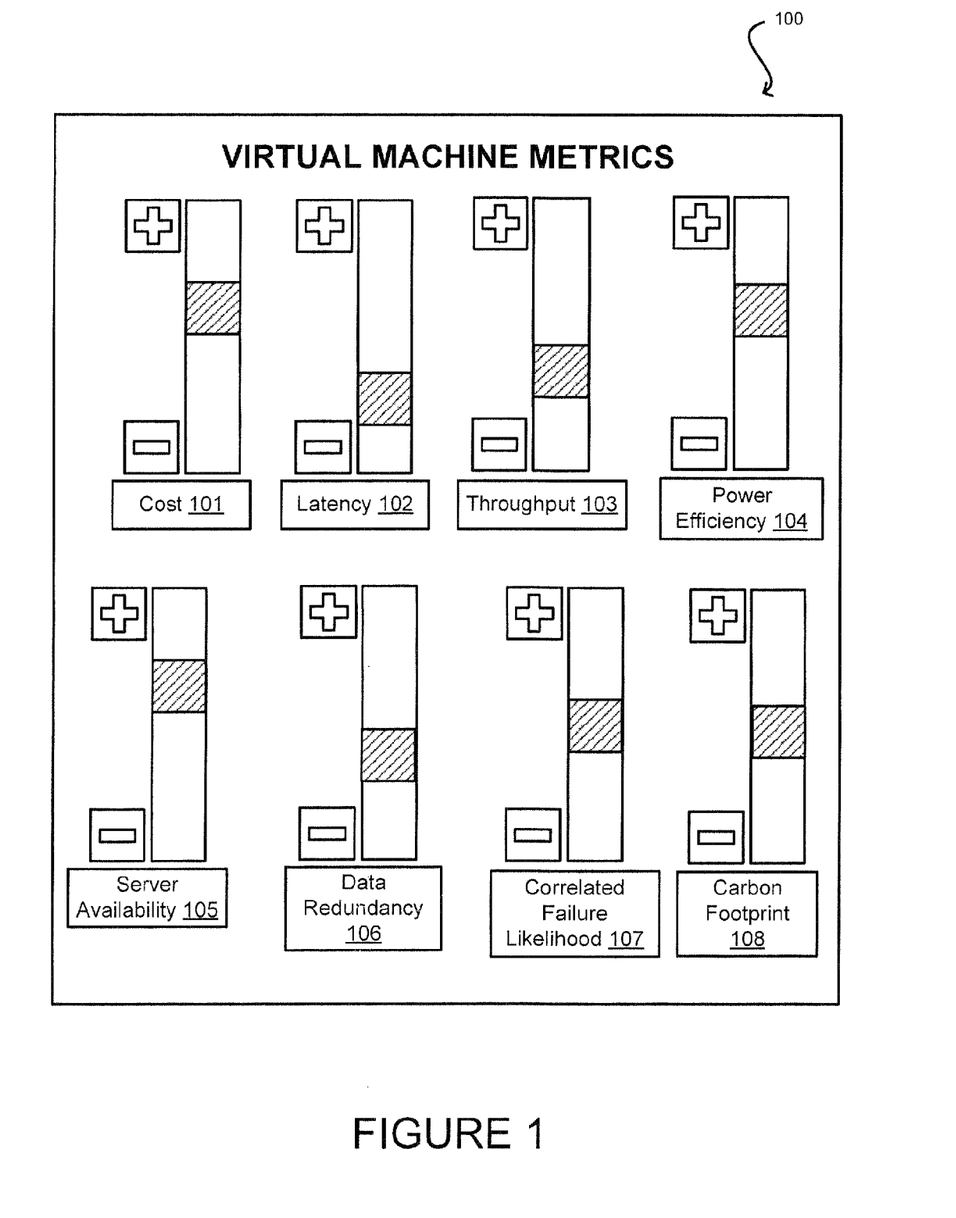
FIG. 1 illustrates an example of an interface for specifying various constraints for the metrics of a virtual machine, in accordance with various embodiments.

FIG. 1 illustrates an example 100 of an interface for specifying various constraints for the metrics of a virtual machine, in accordance with various embodiments. In accordance with the illustrated embodiment, the interface 100 is a graphical user interface (GUI) displayed to a user, such as a customer of a service provider. The GUI includes a number of slider mechanisms (101, 102, 103, 104, 105, 106, 107) that allow a user to manipulate and adjust the level of various metrics associated with their VM or network of VMs. In this particular example, the GUI includes a separate slider mechanism to control each of the cost 101, latency 102, throughput 103, power efficiency 104, server availability 105, data redundancy 106, correlated failure likelihood 107 and the carbon footprint 108 of the virtual machine(s). In other examples and embodiments, the interface can include any number of other metrics and/or other types of input mechanisms that allow the user to manipulate the constraints. It should be noted that although FIG. 1 illustrates a graphical interface, alternative embodiments may utilize an application programming interface (API) to allow the customer to specify the various constraints.

In some embodiments, the interface may dynamically change in response to the user manipulating the values of the metrics. By way of illustration, as the user turns latency 102 lower, the interface may display the cost 101 for the virtual machine increasing, while availability 105 and/or redundancy 106 is decreasing, power usage 104 increasing, correlated failure susceptibility 107 is increasing and so on. For example, decreasing the latency past a certain threshold may cause multiple virtual machines to be provisioned on the same rack of host devices connected to the same top-of-rack (TOR) switch in order to minimize latency, however, this type of deployment may also cause a crash of the TOR switch to impact all servers (i.e. increase the likelihood of a correlated failure). The interface can contain the logic to automatically compute the effect of increasing/decreasing a particular metric on all other metrics that are exposed to the user.

In at least one embodiment, the user may select to "lock in" a value of a particular metric to allow the user to manipulate those metrics which he or she desires. For example, the user may lock in the cost of the virtual machine that they are willing to pay and then manipulate the remaining metrics of the virtual machine until they are satisfied with the configuration. The interface can also enforce bounds and limits for the various metrics of the virtual machine.

In some embodiments, the service provider may supply incentives for customers to modify certain settings, such as by providing pricing incentives for adjusting certain metrics. For example, the service provider may give a customer a substantial price reduction if the customer is willing to turn the availability bar to 0, which would allow the service provider to reboot the customer's VM instance at any time and on any host server. In this example, as the user is dragging the availability bar down, the price may be going down and once the availability metric hits the 0 value, the customer gets a big jump discount. In this manner, the service level agreement (SLA) between the service provider and the customer can be modified based on the user interface.

In various embodiments, the interface may include different visibility levels for each user, where the visibility level is based on the customer's profile. In this manner, depending on who the customer is, they may see a different user interface containing different elements, components and the like. For example, the service provider may display a simplified version of the interface to an average customer, while more sophisticated customers with sufficient permissions may be displayed more detailed and internal implementations (e.g., information about connection to the same TOR switch). In some embodiments, depending on the user's profile, the user may be allowed to drill down further into each metric as described with reference to FIG. 2 below.

Figure 2:
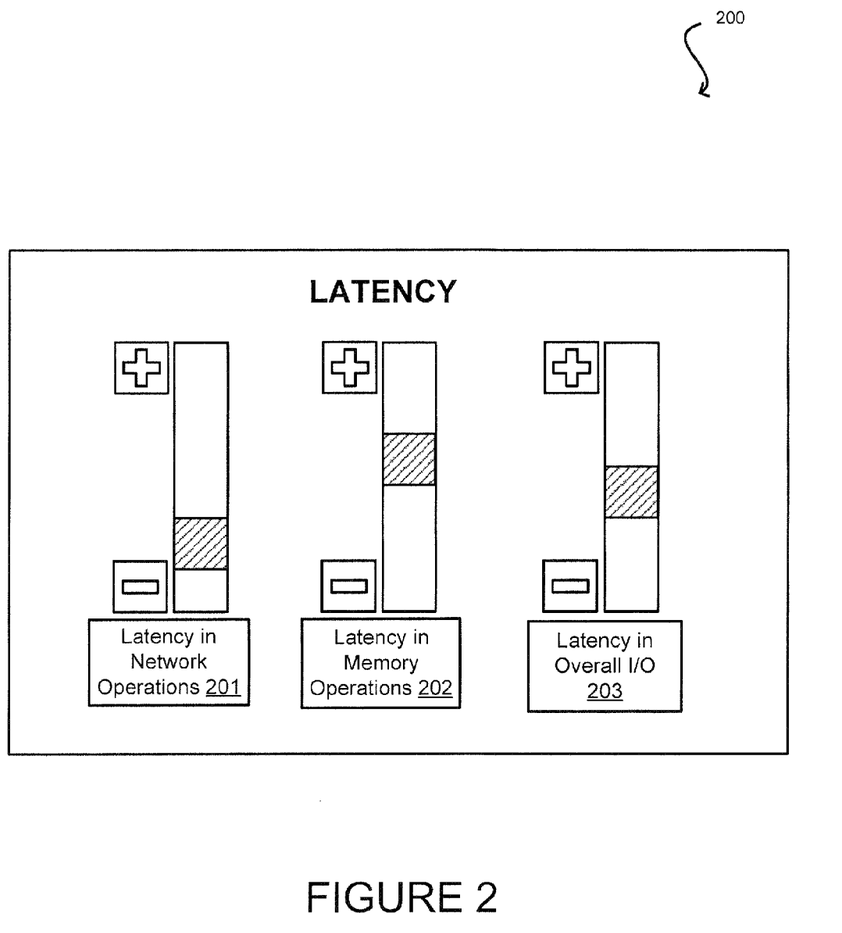
FIG. 2 illustrates an example of an interface that can be displayed when a user drills down further into one of the metrics displayed in FIG. 1, in accordance with various embodiments.

FIG. 2 illustrates an example 200 of an interface that can be displayed when a user drills down further into one of the metrics displayed in FIG. 1, in accordance with various embodiments. In this illustrated example, the user has selected (e.g., double-clicked) the latency metric displayed in FIG. 1. The interface 200 is shown as displaying a further breakdown of the general latency metric, including latency in network operations 201, latency in memory storage operations 202 and latency in overall input/output (I/O) operations 203. In some embodiments, the latency metric displayed in FIG. 1 may be a combination (e.g., weighted average) of the multiple latency metrics displayed in FIG. 2. In this manner, allowing the user to drill down into each metric can provide the user with more granularity of control over the various resources provisioned for them.

In some embodiments, the ability to obtain more specific breakdowns of each metric can be controlled based on a profile associated with the user, as previously described. For example, if the user is an "average" customer that needs a single virtual machine instance to execute an application, they may be provided access to only the top level view of the metrics. On the other hand, more sophisticated users, such as customers that require large networks of VM instances to serve numerous end users, may be allowed to obtain a detailed view of each metric, manipulate more specific metrics and so on.

Figure 3A:
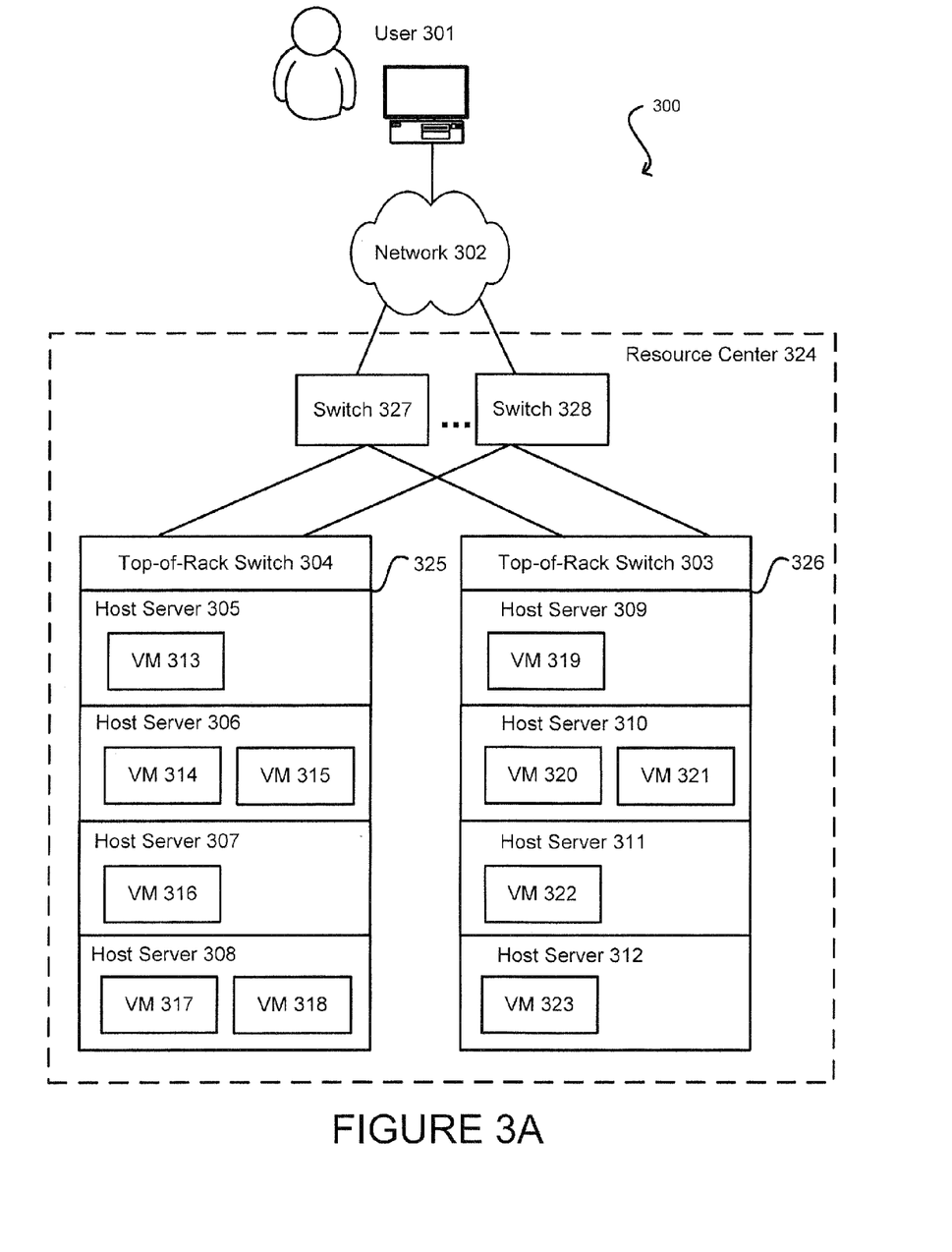
FIG. 3A illustrates an example of a possible architecture for various resources deployed in a resource center of a service provider, in accordance with various embodiments.

FIG. 3A illustrates an example 300 of a possible architecture for various resources deployed in a resource center of a service provider, in accordance with various embodiments. In the illustrated embodiment, the resource center 324 includes a number of racks (325, 326) of host server devices. All of the server devices in each rack may be connected to the same top-of-rack (TOR) switch. For example, as illustrated in this example, host servers (305, 306, 307, 308) are each connected to TOR switch 304, while host servers (309, 310, 311, 312) are each connected to TOR switch 303. The TOR switches 304 and 303 can be in turn connected to other switches, such as switches (327, 328), which can in turn provide a connection to an external network 302, such as the Internet. Switches 327 and 328 can provide redundant connections to the external network 302, such as the Internet. In various alternative embodiments, there can be any number of switches between each rack of servers to provide redundancy or to achieve a particular network topology. For example, if the resource center implements a Euclid or Clos network topology, the topology would include a number of layers, each layer having a number of switches and each switch having a number of ports. A switch on the edge layer of such a network would have half of its ports going to other switches, while a switch in the middle layer of the network would have all of its ports connected to other switches. Any number of such network topologies is possible within the scope of the present disclosure.

In various embodiments each host server can host a number of virtual machine instances (313-323) provisioned for the various users. Some host servers may host a single virtual machine instance, while other servers may host multiple VM instances. For example, in the illustrated example, host servers (305, 307, 309, 311, 312) each host a single VM instance (313, 316, 319, 322, 323) while host servers (306, 308, 310) each host multiple VM instances (314, 315, 317, 318, 320, 321). Users who own the various VM instances can connect to the resource center 324 over an internet connection and can use the interface described throughout this disclosure to specify constraints and manipulate the metrics of their VM instances.

Once the user specifies the constraints for the various metrics, the service provider can optimize the VM placement (host selection) and settings (e.g., VM settings, physical hardware settings, software settings, firmware settings, etc.) to satisfy the specified constraints. In various embodiments, the satisfaction of these constraints can be carried out by manipulating any number of settings and placement logic.

As one example, there may be different hardware server types for each host device in the architecture of the service provider. Some server types may have redundant power supplies or other components, while other server types do not. If the customer increases the server availability metric, in order to satisfy that constraint, the service provider may switch from one server type to another, thereby increasing cost, power requirements and the like. In some cases, if the customer turns the availability metric to very high, the service provider may choose to spread the customer's virtual machines over different server types such that no two VMs are on the same underlying hardware platform. In other cases, the customer may want exactly the same physical platform for all their VM instances.

As another example, various internal sub-networks at the resource center of the service provider may have different attributes, such as 10 gigabit Ethernet or 1 gigabit Ethernet. If the customer manipulates the bandwidth, latency or throughput requirements, the service provider may choose to provision the customer's virtual machine instances on a 10 gig network versus a 1 gig network to increase or decrease performance. In some embodiments, the service provider may throttle the bandwidth of a particular customer's VM instances in light of VMs of other customers provisioned in the shared resource environment. For example, if a customer indicates that they favor latency and they expect 10 gigabit network latency, the service provider can throttle their bandwidth down to be less than 10 gig. In other words, if the customer does not care about latency, then they can get lower cost or higher throughput, for example, by the service provider placing their VMs on the same hosts as VMs of customers that care about the opposite metrics.

As another example, there may be different physical setups and/or configurations of resources that the service provider may implement to satisfy the user-specified data availability constraints. In some embodiments, when the customer increases the data availability constraint, instead of a single master-slave configuration, the service provider may provision a master with multiple slaves (e.g., two or more slaves). This may simultaneously increase price and decrease latency for example. Alternatively, the service provider may provision the VM to have 3 persistent copies of a data instance. In some embodiments, to satisfy increased data availability constraints, the service provider may adjust a level of redundant array of independent disk (RAID) for distributing data across the physical disks of the host servers. In other embodiments, the service provider can create a full hot failover by synchronizing RAM and CPU state across two or more physical host servers, thereby decreasing speed significantly. In some cases, this can be transparent to customer. In this example, memory controller technology (e.g., lockstep systems) can be used wherein replicated writes and reads are performed from replicated memory channels.

As another example, to satisfy power usage or latency constraints, the service provider may adjust the power settings of memory, clock cycles, CPU cycle frequency, or other settings of a host server in order to increase/reduce power usage, cost and speed. For some host servers, the service provider may utilize a random access memory (RAM) bank that is shared by multiple host devices (e.g., per rack shared hardware). This may introduce higher latency for operations due to remote access, however it may decrease costs for the customer. As such, the service provider may provision the customer's VM to have its own local RAM bank if the customer requires extremely low latency, or a shared RAM bank if the customer does not care about the latency of various operations.

As another example, to satisfy latency constraints for a customer's virtual network of multiple VMs, the service provider may provision all of the VMs on the same rack. In this case, latency is reduced because all of the VMs are connected to the same TOR switch, however, this may also increase correlated failure likelihood such that a crash of the TOR switch would impact all servers.

As another example, the number and/or type of switches can influence the placement of the virtual machine onto a host server. For example, if availability constraint is set to be high, the virtual machine may be placed onto a server having multiple redundant switch connections to the external network, in order to reduce the likelihood that a switch malfunction would affect the virtual machine. Additionally, the network topology may influence the placement decision. For example, certain network topologies may provide higher availability, while other topologies may be optimized for latency or bandwidth. Depending on the constraints specified by the user, the service provider may choose between a number of different networks of different topologies when deploying the user's virtual machine instance.

Figure 3B:
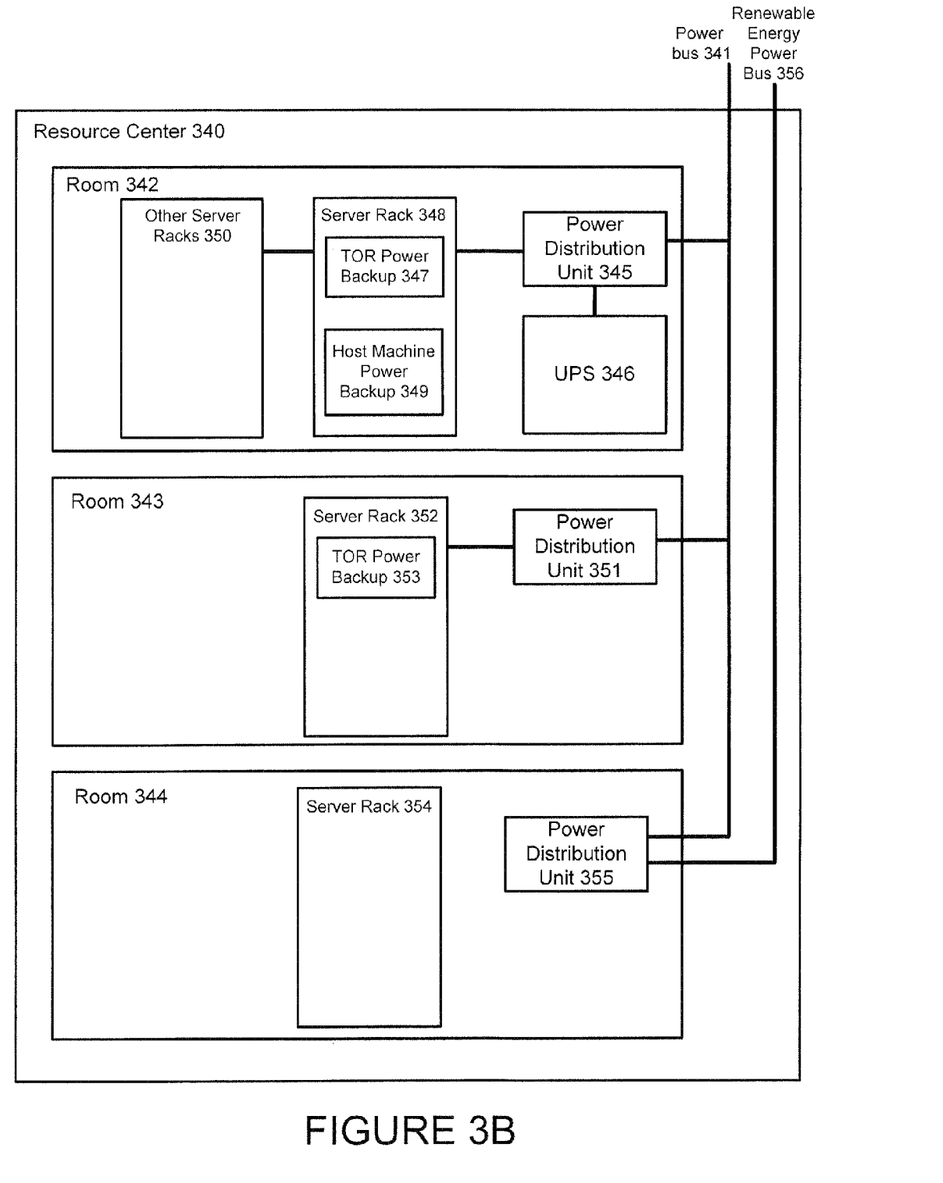
FIG. 3B illustrates a power topology of a resource center and the various resources therein, in accordance with various embodiments.

FIG. 3B illustrates a power topology of a resource center and the various resources therein, in accordance with various embodiments. In the illustrated embodiment, the resource center 340 includes a plurality of rooms (342, 343, 344) wherein each room stores a number of server racks (348, 350, 352, 354). A main power bus 341 running into the resource center supplies power to the various resources, such as the racks of host servers stored in the resource center. In some embodiments, there may be several main power buses, such as the regular power bus 341 and the renewable energy power bus 356. The renewable energy power bus may supply electricity gathered from renewable energy sources (e.g., "green" energy sources), such as solar, wind, hydroelectric and the like. In some embodiments, the user (e.g., customer may specify constraints that require the virtual machine instances assigned to the customer to be hosted on host servers that are running at least partially on renewable energy.

In various embodiments, the resource center may include a number of different power topologies for the various resources therein. For example, as shown in the illustration, room 342 includes a power distribution unit 345 that distributes the incoming power to the various server racks (348, 350) in the room. Room 342 also includes an uninterruptible power supply (UPS) 346 that provides emergency power for all of the server racks in room 342 if the main power bus should fail (e.g., in the event of a major power outage). In addition, each server rack (348, 350) in room 342 includes a power backup supply (e.g., battery, etc.) that supplies power to the host server devices in the rack if the power should fail from both the main power bus 341 and the UPS 346. Moreover, each host server in the rack includes its own host machine power backup 349 (e.g., battery, etc.) that provides an additional power redundancy if the other power backups happen to fail. As such, in the illustrated example, room 342 of the resource center has the highest power redundancy out of all the rooms in the resource center.

In the illustrated embodiment, other rooms (343, 344) also include power distribution units (351, 355), however each of these rooms has a different level of power redundancy. For example, room 343 has redundant power only at the server rack level by including a top-of-rack (TOR) power backup 353. Room 344, on the other hand, has no power backup and is designed to hold applications that are highly fault tolerant and can be terminated at any time. Virtual machines and applications hosted in room 344 may be provided to the customer at a discount for example.

In various embodiments, the customer is allowed to specify constraints that take into account the power topology of the environment in which the virtual machine will be hosted. For example, if the customer wants to ensure the highest level of availability or power redundancy, the virtual machine may be hosted in room 342. Customers that do not care about power redundancy, on the other hand, may be hosted in room 344. Additionally, if a customer specifies that their application must be environmentally friendly (e.g., by turning down the carbon footprint element 108), the virtual machine may be placed on power supplied from renewable energy sources, as previously described. Furthermore, certain customers may wish to specify the amount of peak power that their applications may utilize and this factor may be taken into consideration when placing the virtual machine in the resource center.

In some embodiments, the rooms in the resource center may be associated with a particular temperature and this can be another factor to consider when provisioning the virtual machine instance for a customer. For example, if the VM instance is required to have high availability, it may be placed in a room that has a temperature of 40 degrees Fahrenheit as opposed to a standard 60 degree room in order to reduce the likelihood of overheating any hardware components used to host the application. This may also increase the cost of hosting that particular virtual machine instance.

Figure 4A:
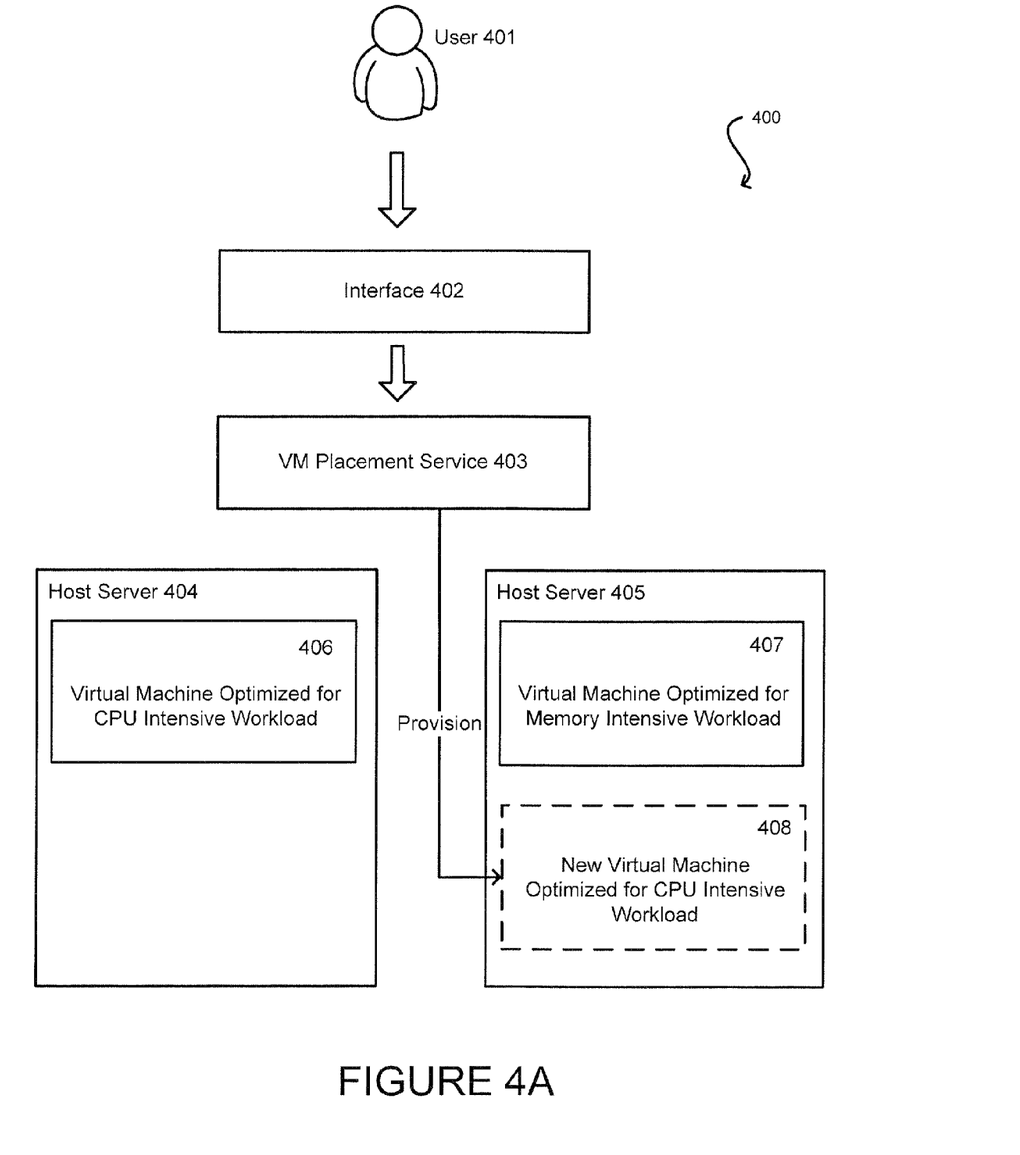
FIG. 4A illustrates an example of provisioning a virtual machine of a customer in a shared resource environment that includes virtual machines provisioned for other customers, in accordance with various embodiments.

FIG. 4A illustrates an example 400 of provisioning a virtual machine of a customer in a shared resource environment that includes virtual machines provisioned for other customers, in accordance with various embodiments. In the illustrated embodiment, a user 401 (e.g., customer) specifies a set of constraints for the metrics of their virtual machine by accessing an interface 402, as previously described. The specified constraints can then be provided to a placement service 403 that is responsible for provisioning the virtual machine instance for the customer. The placement service can be a centralized or distributed service that runs on the network of the service provider.

In accordance with an embodiment, the placement service 402 can analyze the virtual machine instances provisioned on the available host servers and, based on that analysis, determine which host server to place the customer's virtual machine instance on. In the illustrated example, host server 404 currently hosts a virtual machine 406 that is performing workload that requires CPU-intensive operations. Host server 405, on the other hand, currently hosts a virtual machine 407 that requires memory-intensive operations. If the customer 401 has specified that the new virtual machine assigned to them will require CPU-intensive operations, the placement service may choose to provision the new virtual machine on host server 405 because the VM 407 running on that server would not cause as much of an impact on the CPU capacity of the hardware resources. As such, host server 405 may be a better option for running the new VM instance for the customer. It should be noted that this is only one simplified example of the decisions that may be utilized by the placement service and that many other more complex decision models are possible within the scope of various embodiments described herein. The illustration of FIG. 4 is not intended to be in any way limiting to this disclosure and is provided to show an example of a placement service considering the virtual machine instances of other customers when provisioning a new VM instance in light of the user-specified constraints.

In another embodiment, a virtual machine instance of one customer can be migrated from one host server to another host server in the resource center in order to free up a particular host server that is currently hosting the VM instance. In this manner, the host server can be made available to another customer whose VMs may be better suited to run on the host computing device. In some cases, the migration can be performed by the service provider transparently from the customer's perspective, i.e. without the customer knowing about the migration. The migration can be performed live while the customer's VM instance is running or by stopping the VM instance and restarting the VM instance on a different host machine. The migration of VM instances can help reduce fragmentation and improve utilization of hardware resources of the service provider. In some embodiments, the placement and/or migration of VM instances can be based at least in part on customer history that can be tracked by the service provider.

Figure 4B:
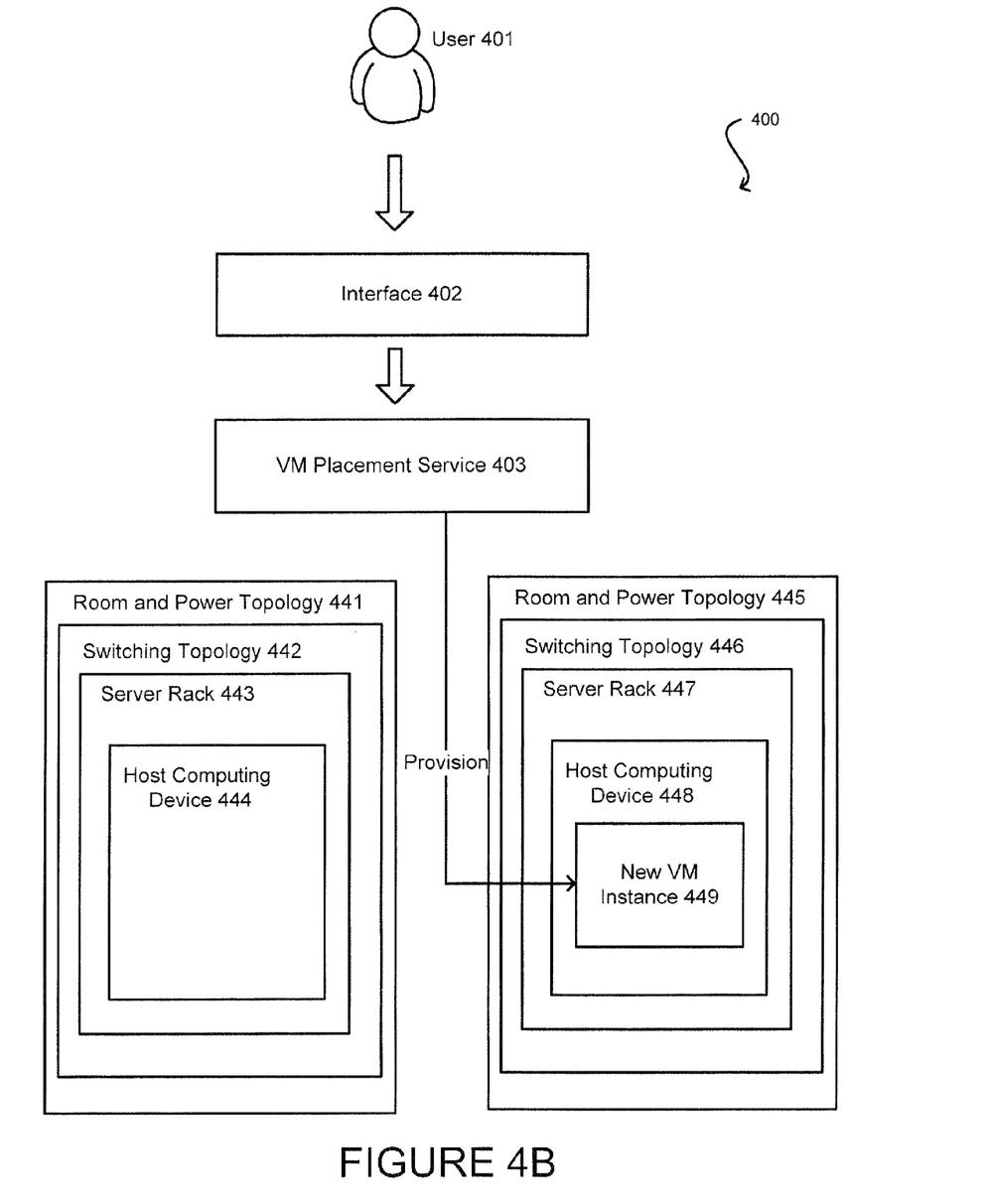
FIG. 4B illustrates an example of a placement service determining where to place a virtual machine instance in accordance with various embodiments.

FIG. 4B illustrates an example of a placement service determining where to place a virtual machine instance in accordance with various embodiments. In the illustrated embodiment, the placement service 403 can take into consideration the room and power topology (441, 445), the switching topology (442, 446), the server rack (443, 447) and the particular host server computing device 444, 448) when deciding where to provision and run the virtual machine instance for a user 401. For example, if the placement service 403 determines that the user has specified that the virtual machine instance will require high availability based on input from the interface 402, then the placement service may select a power topology 445 with multiple levels of power redundancy, as previously described with reference to FIG. 3B. In this situation, the placement service may provision the virtual machine in a room that includes a UPS for the entire room, as well as backup battery power for each server rack, host server and the like. Similarly, the placement service may select a switching topology 446 that has numerous redundant switches connecting the host server to the external network in order to reduce the likelihood that a dead switch will interrupt the execution of the VM instance. Furthermore, the placement service may ensure that both the server rack 447 and the particular host server 448 both have redundant power supplies.

In various embodiments, any number of topology, device or software characteristics can be taken into consideration when provisioning the virtual machine instance. For example, the type of server and the network switching topology may also affect the latency and bandwidth available to the virtual machine instance. In that case, if the user has specified that low latency is important for the virtual machine instance, it may select server hardware types and/or switching topologies that are particularly suitable for low latency operations.

Figure 5:
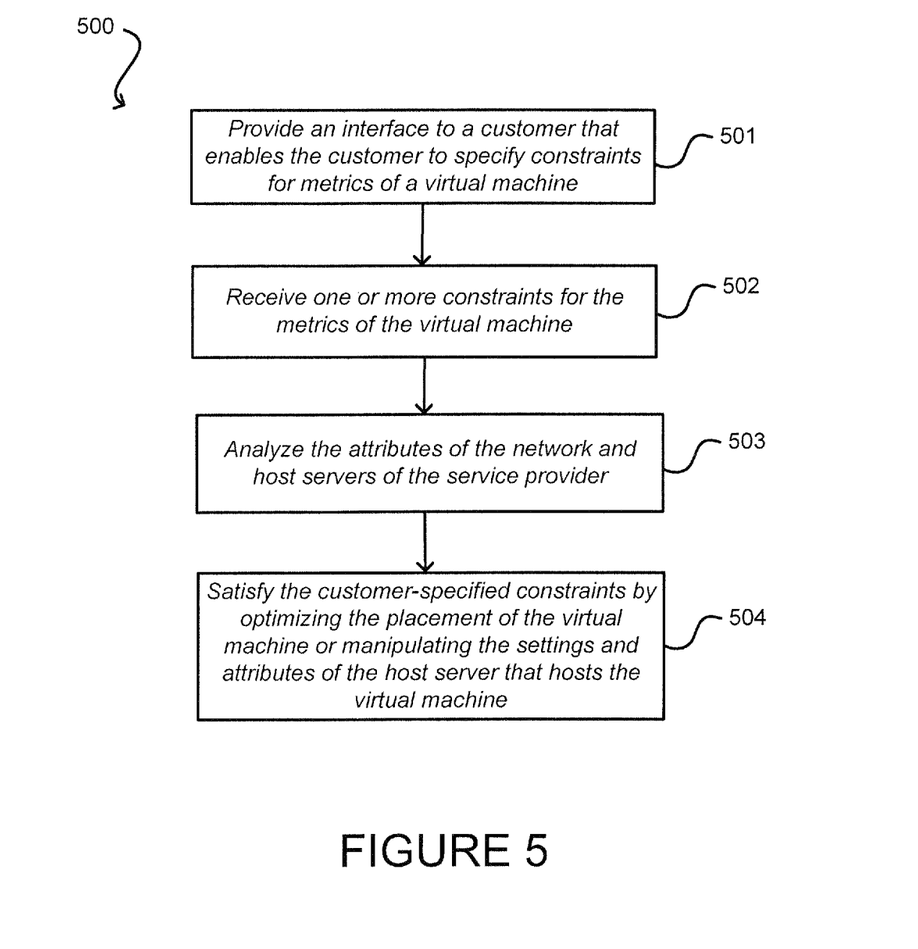
FIG. 5 illustrates an example process enabling a user to specify constraints for a virtual machine instance, in accordance with various embodiments.

FIG. 5 illustrates an example process 500 enabling a user to specify constraints for a virtual machine instance, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 501, the service provider exposes an interface to the users (e.g., customers) that enables the user to specify a set of constraints for their requested virtual machine instance or network of virtual machine instances. In some embodiments, the interface can be a graphical user interface, such as a web page that includes a number of graphical elements that can be manipulated by the user to increase or decrease the various metrics associated with the virtual machine (e.g., cost, power, latency, throughput, availability, etc.). In other embodiments, the interface can be an application programming interface (API), such as a web services API that allows the user to specify the values of various constraints programmatically.

In operation 502, the service provider receives one or more constraints from the user by way of the interface. In various embodiments, the constraints can specify the minimum or maximum values of various metrics (e.g. number of transactions per second, time to complete a request, percentage of server availability etc.).

In operation 503, the service provider can analyze its various network attributes and host device attributes in determining how to best satisfy the constraints specified by the user. For example, a placement service can analyze the various host device settings and VM instances of other customers and select which host onto which to provision the new VM.

In operation 504, the service provider can satisfy the customer-specified constraints by optimizing the placement of the VM instance or by manipulating the settings and other attributes of the host servers that will be hosting the VM instance. For example, the placement service may provision the VM instance onto a host server that hosts VM instances that have been configured for opposite metrics as previously described. Alternatively, the service provider may adjust certain settings at runtime (e.g., modify CPU clock cycles, interrupt coalescing, etc.) at runtime, after the VM instance has been deployed. Some changes may require a restart of the server or of the VM instance, while other changes may be performed live while the VM is running on the server.

Figure 6:
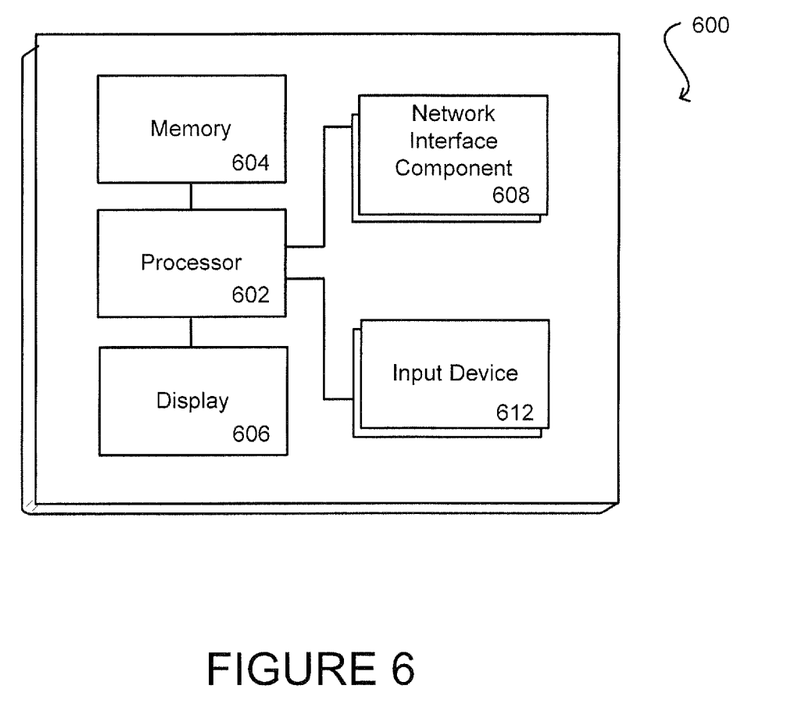
FIG. 6 illustrates a logical arrangement of a set of general components of an example computing device that can be utilized in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. As discussed, the device in many embodiments will include at least one input element 608 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
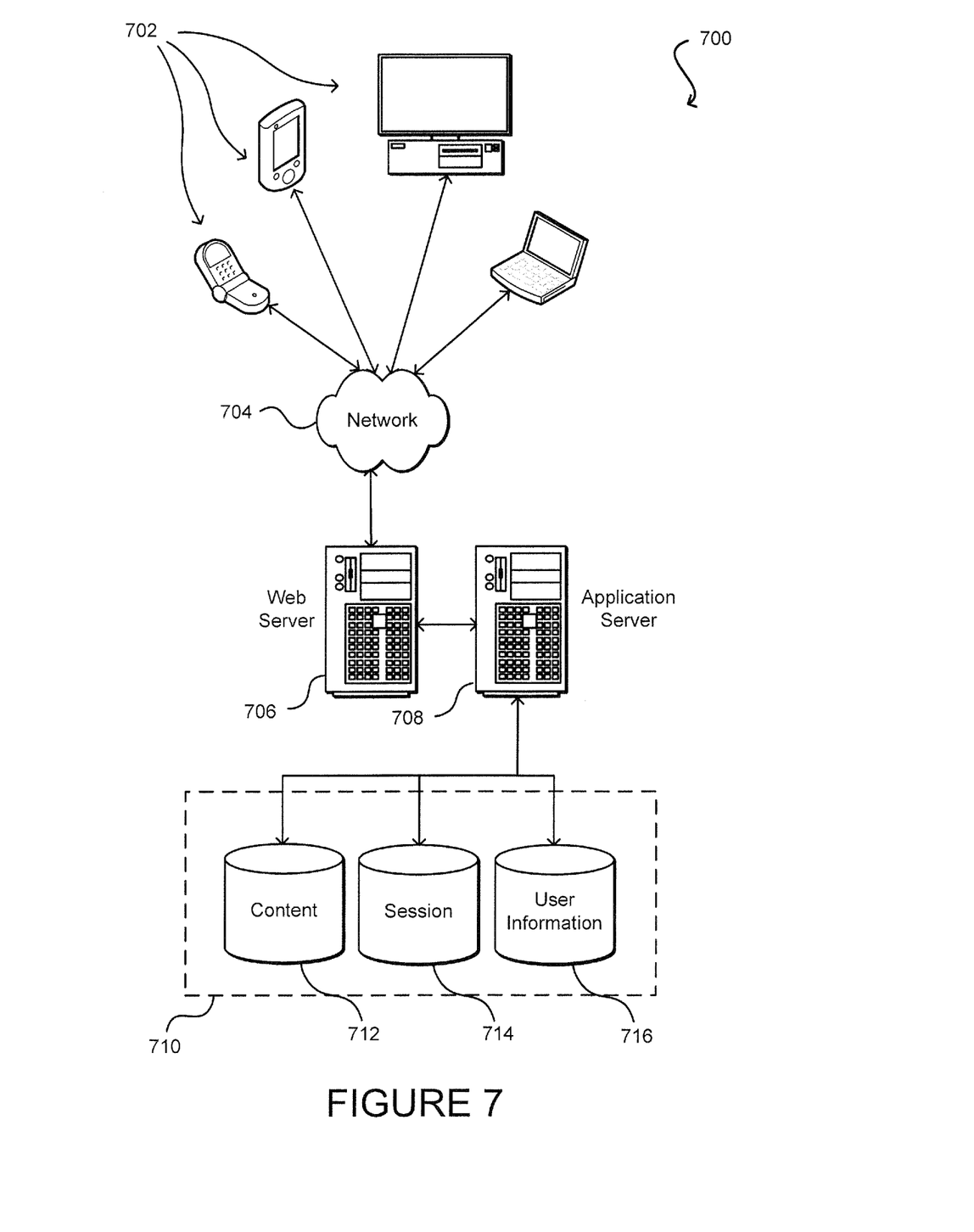
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in sonic cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for tuning performance settings in a virtualized computing environment, said method comprising:

exposing an interface to a customer, the interface enabling the customer to manipulate a plurality of metrics associated with at least one virtual machine instance provisioned for the customer, the plurality of metrics including one or more of latency, throughput, power, cost, server availability, data redundancy, or correlated failure susceptibility, wherein the at least one virtual machine instance uses a central processing unit to perform operations for the customer;

receiving, from the customer using the interface, one or more specified constraints for at least a portion of the plurality of metrics;

selecting at least one host computing device on which to provision the at least one virtual machine instance, the selected host computing device being configured with one or more settings that are based at least in part on the one or more specified constraints; and provisioning the virtual machine instance for the customer on the selected host computing device, wherein the interface comprises at least one graphical element for each metric of the plurality of metrics, the graphical element operable by the customer to adjust a value of the metric, wherein adjusting the value of the metric causes the interface to display modified values of one or more other metrics associated with the virtual machine instance.

2. The computer-implemented method of claim 1, wherein selecting the host computing device on which to provision the virtual machine instance further includes:

inspecting a workload being executed by at least one other virtual machine instance provisioned on the host computing device; and selecting the host computing device based at least in part on both (a) the workload being executed by the other virtual machine instance and (b) the one or more specified constraints received from the customer.

3. A computer implemented method, comprising:

providing an interface including a plurality of elements, each element operable by a user to manipulate a value of a metric associated with at least one virtual machine, the virtual machine capable of being provisioned for the user on at least one host device, wherein the virtual machine uses a central processing unit to perform operations for the user;

receiving one or more values for the metrics as a result of the elements being manipulated on the interface by the user;

causing one or more settings to be applied to at least one of: the virtual machine or the host device, the one or more settings based at least in part on the received one or more values; and determining, based on the received values, that a data redundancy metric specified by the user is higher than a threshold, and performing at least one of:

configuring the virtual machine to be associated with one or more slave instances configured to store redundant copies of data for the virtual machine;

adjusting a RAID level of distributing data of the virtual machine across one or more drives on the host device; or synchronizing memory and a state of the central processing unit between the virtual machine and at least one other virtual machine by replicating read and write operations between the virtual machine and the other virtual machine.

4. The computer implemented method of claim 3, wherein the plurality of metrics further includes one or more of:

latency, throughput, network bandwidth, power efficiency, server availability, data redundancy, or correlated failure susceptibility.

5. The computer implemented method of claim 3, wherein the plurality of elements displayed on the interface are based at least in part on a profile associated with the user, wherein the elements displayed to a first user are different from the elements displayed to a second user.

6. The computer implemented method of claim 3, wherein causing the one or more settings to be configured further includes:

selecting at least one host device on which to provision the virtual machine based at least in part on one or more hardware attributes of the host device, wherein the hardware attributes are associated with the received values.

7. The computer implemented method of claim 3, wherein causing the one or more settings to be applied further includes:

migrating a virtual machine from a first host device to a second host device.

8. The computer implemented method of claim 3, wherein the virtual machine is migrated to make the host device available for hosting a second virtual machine.

9. The computer implemented method of claim 3, wherein causing the one or more settings to be applied further includes:

inspecting history information associated with the user; and selecting at least one host device on which to provision the virtual machine based at least in part on the history information associated with the user.

10. The computer implemented method of claim 3, further comprising:

provisioning a virtual network of a plurality of virtual machines, the virtual network being associated with the one or more settings that are based at least in part on the received values.

11. The computer implemented method of claim 10, further comprising:

provisioning, based on a latency metric specified by the user, all of the plurality of virtual machines on one or more host devices connected to a single top-of-rack switch.

12. The computer implemented method of claim 10, further comprising:

distributing, based on an availability metric specified by the user, the plurality of virtual machines over different server types to preclude multiple virtual machine instances from being hosted on a same server type.

13. The computer implemented method of claim 3, further comprising:

providing, based on a latency metric specified by the user, access to a shared random access memory (RAM) bank for the virtual machine, the shared RAM bank being shared by the host device and one or more other host devices.

14. The computer implemented method of claim 3, wherein causing the one or more settings to be applied further includes:

throttling a metric of a virtual machine instance based at least in part on other virtual machine instances deployed on a host server that hosts the virtual machine instance.

15. The computer implemented method of claim 3, wherein causing one or more settings to be applied further includes:

selecting a host server for hosting the virtual machine based at least in part on a power topology associated with said host server.

16. The computer implemented method of claim 15, wherein the power topology is associated with a level of redundant power supplies that are available to the host server hosting the virtual machine in an event of a power outage.

17. The computer implemented method of claim 3, wherein receiving the one or more values further includes:

receiving the one or more values for a power efficiency metric; and provisioning the virtual machine on host server that receives electricity from a renewable energy power source.

18. A computing system, comprising:
   at least one processor; and
   memory including instructions that, when executed by the processor, cause the computing system to:
      provide an interface including a plurality of elements, each element operable by a user to manipulate a value of a metric associated with at least one virtual machine, the virtual machine capable of being provisioned for the user on at least one host device, wherein the at least one virtual machine uses the at least one processor to perform operations for the user;
      receive one or more values for the metrics as a result of the elements being manipulated on the interface by the user;
      cause one or more settings to be applied to at least one of: the virtual machine or the host device, the one or more settings based at least in part on the received one or more values;
      provision a virtual network of a plurality of virtual machines, the virtual network being associated with the one or more settings that are based at least on the received values;
      determine, based on the received values, that a latency metric specified by the user lower than a threshold; and
      provision all of the plurality of virtual machines on one or more host devices connected to a single top-of-rack switch.

19. The computing system of claim 18, wherein the memory further includes instructions to:
   provision a virtual network of a plurality of virtual machines, the virtual network being associated with the one or more settings that are based at least in part on the received values.

20. The computing system of claim 19, wherein the memory further includes instructions to:
   determine, based on the received values, that a latency metric specified by the user lower than a threshold; and
   provision all of the plurality of virtual machines on one or more host devices connected to a single top-of-rack switch.

21. The computing system of claim 18, wherein the memory further includes instructions to:
   determine, based on the received values, that a data redundancy metric specified by the user is higher than a threshold, and perform at least one of:
      configuring the virtual machine to be associated with one or more slave instances configured to store redundant copies of data for the virtual machine;
      adjusting a RAID level of distributing data of the virtual machine across one or more drives on the host device; or
      synchronizing memory and a central processing unit (CPU) state between the virtual machine and at least one other virtual machine by replicating read and write operations between the virtual machine and the other virtual machine.

22. The computing system of claim 18, wherein the memory further includes instructions to:
   determine, based on the received values, that a latency metric specified by the user higher than a threshold; and
   provide access to a shared random access memory (RAM) bank for the virtual machine, the shared RAM bank being shared by the host device and one or more other host devices.

23. The computing system of claim 18, wherein the memory further includes instructions to:
   determine, based on the received values that an availability metric specified by the user is higher than a threshold; and
   distribute the plurality of virtual machines over different server types to preclude multiple virtual machine instances from being hosted on a same server type.

24. The computing system of claim 18, wherein causing the one or more settings to be applied further includes:
   throttling a metric of a virtual machine instance based at least in part on other virtual machine instances deployed on a host server that hosts the virtual machine instance.

25. A non-transitory computer readable storage medium storing one or more sequences of instructions executable by one or more processors to perform a set of operations comprising:
   providing an interface including a plurality of elements, each element operable by a user to manipulate a value of a metric associated with at least one virtual machine, the virtual machine capable of being provisioned for the user on at least one host device, wherein the at least one virtual machine uses a central processing unit to perform operations for the user;
   receiving one or more values for the metrics as a result of the elements being manipulated on the interface by the user; and
   causing one or more settings to be applied to at least one of: the virtual machine or the host device, the one or more settings based at least in part on the received one or more values,
   wherein the interface comprises at least one graphical element for each metric of the plurality of metrics, the graphical element operable by the user to adjust a value of the metric, wherein adjusting the value of the metric causes the interface to display modified values of one or more other metrics associated with the virtual machine.

26. The non-transitory computer readable storage medium of claim 25, wherein the plurality of metrics further includes one or more of:
   latency, throughput, network bandwidth, power usage, server availability, data redundancy, or correlated failure susceptibility.

27. The non-transitory computer readable storage medium of claim 25, wherein the plurality of elements displayed on the interface are based at least in part on a profile associated with the user, wherein the elements displayed to a first user are different from the elements displayed to a second user.

28. The non-transitory computer readable storage medium of claim 25, wherein causing the one or more settings to be configured further includes:
   selecting at least one host device on which to provision the virtual machine based at least in part on one or more hardware attributes of the host device, wherein the hardware attributes are associated with the received values.

* * * * *